United States Patent
Lin et al.

(10) Patent No.: US 11,122,260 B2
(45) Date of Patent: Sep. 14, 2021

(54) METHOD AND APPARATUS OF MERGE LIST GENERATION FOR INTRA BLOCK COPY MODE

(71) Applicant: MEDIATEK INC., Hsinchu (TW)

(72) Inventors: Yu-Cheng Lin, Hsinchu (TW); Chun-Chia Chen, Hsinchu (TW); Chih-Wei Hsu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/794,309

(22) Filed: Feb. 19, 2020

(65) Prior Publication Data

US 2020/0275120 A1 Aug. 27, 2020

Related U.S. Application Data

(60) Provisional application No. 62/808,940, filed on Feb. 22, 2019.

(51) Int. Cl.
| | |
|---|---|
| *H04N 19/52* | (2014.01) |
| *H04N 19/176* | (2014.01) |
| *H04N 19/105* | (2014.01) |
| *H04N 19/159* | (2014.01) |
| *H04N 19/137* | (2014.01) |

(52) U.S. Cl.
CPC ......... *H04N 19/105* (2014.11); *H04N 19/137* (2014.11); *H04N 19/159* (2014.11); *H04N 19/176* (2014.11); *H04N 19/52* (2014.11)

(58) Field of Classification Search
None
See application file for complete search history.

(56) References Cited

U.S. PATENT DOCUMENTS

| | | | |
|---|---|---|---|
| 9,832,467 | B2 | 11/2017 | Rapaka et al. |
| 9,854,237 | B2 | 12/2017 | Pang et al. |
| 10,264,290 | B2 | 4/2019 | Xu et al. |

(Continued)

FOREIGN PATENT DOCUMENTS

| | | |
|---|---|---|
| CN | 105684441 A | 6/2016 |
| CN | 106797466 A | 5/2017 |

(Continued)

OTHER PUBLICATIONS

Zhang, L., et al.; "CE4-related: History-based Motion Vector Prediction;" Joint Video Experts Team (JVET) of ITU-T SG 16 WP 3 and ISO/IEC JTC 1/SC 29/WG 11; Jul. 2018; pp. 1-80.

*Primary Examiner* — Frederick D Bailey
(74) *Attorney, Agent, or Firm* — McClure, Qualey & Rodack, LLP

(57) ABSTRACT

A method and apparatus of Inter prediction for video coding including IBC (Intra Block Copy) are disclosed. In one method, an IBC Merge candidate list is generated from Merge candidates associated with one or more candidate types, wherein one or more target candidates associated with a target candidate type are excluded from the IBC Merge candidate list when one or more constraints are satisfied. Current motion information associated with the current block is encoded or decoded using the IBC Merge candidate list. According to another method, a pruning process for the IBC Merge candidate list is skipped or simplified according to block width, block height, or block area of the current block.

17 Claims, 11 Drawing Sheets

(56) References Cited

U.S. PATENT DOCUMENTS

| | | | |
|---|---|---|---|
| 10,362,330 B1* | 7/2019 | Li | H04N 19/44 |
| 10,812,822 B2 | 10/2020 | Rapaka et al. | |
| 2016/0105670 A1* | 4/2016 | Pang | H04N 19/176 375/240.16 |
| 2017/0054996 A1 | 2/2017 | Xu et al. | |
| 2017/0280159 A1 | 9/2017 | Xu et al. | |
| 2020/0021836 A1* | 1/2020 | Xu | H04N 19/176 |
| 2020/0236384 A1* | 7/2020 | Xu | H04N 19/513 |
| 2020/0244979 A1* | 7/2020 | Li | H04N 19/137 |

FOREIGN PATENT DOCUMENTS

| | | |
|---|---|---|
| CN | 106797477 A | 5/2017 |
| CN | 108141605 A | 6/2018 |

* cited by examiner

M/2XM
Symmetric vertical splitting

MxM/2
Symmetric horizontal splitting

M/4xM(L)

M/4xM(R)

MxM/4(U)

MxM/4(D)

| Merge_idx | L0 | L1 |
|---|---|---|
| 0 | mvL0_A,ref0 | - |
| 1 | - | mvL1_B,ref0 |
| 2 | mvL0_A,ref0 | mvL1_B,ref0 |
| 3 | | |
| 4 | | |

840

| Merge_idx | L0 | L1 |
|---|---|---|
| 0 | mvL0_A,ref0 | - |
| 1 | - | mvL1_B,ref0 |
| 2 | mvL0_A,ref0 | mvL1_B,ref0 |
| 3 | (0,0),ref0 | (0,0),ref0 |
| 4 | (0,0), ref1 | (0,0), ref1 |

| amvp_idx | L0 |
|---|---|
| 0 | mvL0_A |
| 1 | mvL0_B |
| 2 | |

862

| amvp_idx | L1 |
|---|---|
| 0 | mvL1_A |
| 1 | |
| 2 | |

870

| amvp_idx | L0 |
|---|---|
| 0 | mvL0_A |
| 1 | mvL0_B |
| 2 | (0,0) |

872

| amvp_idx | L1 |
|---|---|
| 0 | mvL1_A |
| 1 | (0,0) |
| 2 | |

*Fig. 8C*

An Example of Permitted Band

An Example of Permitted Band

Fig. 9E  Fig. 9F

METHOD AND APPARATUS OF MERGE LIST GENERATION FOR INTRA BLOCK COPY MODE

CROSS REFERENCE TO RELATED APPLICATIONS

The present invention claims priority to U.S. Provisional Patent Application, Ser. No. 62/808,940, filed on Feb. 22, 2019. The U.S. Provisional Patent Application is hereby incorporated by reference in its entirety.

FIELD OF THE INVENTION

The present invention relates to Intra Block Copy (IBC) prediction for video coding. In particular, the present invention discloses techniques to simplify the Merge list generation process.

BACKGROUND AND RELATED ART

The High Efficiency Video Coding (HEVC) standard is developed under the joint video project of the ITU-T Video Coding Experts Group (VCEG) and the ISO/IEC Moving Picture Experts Group (MPEG) standardization organizations, and is especially with partnership known as the Joint Collaborative Team on Video Coding (JCT-VC). In HEVC, one slice is partitioned into multiple coding tree units (CTU). In main profile, the minimum and the maximum sizes of CTU are specified by the syntax elements in the sequence parameter set (SPS). The allowed CTU size can be 8×8, 16×16, 32×32, or 64×64. For each slice, the CTUs within the slice are processed according to a raster scan order.

The CTU is further partitioned into multiple coding units (CU) to adapt to various local characteristics. A quadtree, denoted as the coding tree, is used to partition the CTU into multiple CUs. Let CTU size be M×M, where M is one of the values of 64, 32, or 16. The CTU can be a single CU (i.e., no splitting) or can be split into four smaller units of equal sizes (i.e., M/2×M/2 each), which correspond to the nodes of the coding tree. If units are leaf nodes of the coding tree, the units become CUs. Otherwise, the quadtree splitting process can be iterated until the size for a node reaches a minimum allowed CU size as specified in the SPS (Sequence Parameter Set). This representation results in a recursive structure as specified by a coding tree (also referred to as a partition tree structure) 120 in FIG. 1. The CTU partition 110 is shown in FIG. 1, where the solid lines indicate CU boundaries. The decision whether to code a picture area using Inter-picture (temporal) or Intra-picture (spatial) prediction is made at the CU level. Since the minimum CU size can be 8×8, the minimum granularity for switching between different basic prediction types is 8×8.

Furthermore, according to HEVC, each CU can be partitioned into one or more prediction units (PU). Coupled with the CU, the PU works as a basic representative block for sharing the prediction information. Inside each PU, the same prediction process is applied and the relevant information is transmitted to the decoder on a PU basis. A CU can be split into one, two or four PUs according to the PU splitting type. HEVC defines eight shapes for splitting a CU into PU as shown in FIG. 2, including M×M, M×M/2, M/2×M, M/2×M/2, M×M/4(U), M×M/4(D), M/4×M(L) and M/4×M(R) partition types. Unlike the CU, the PU may only be split once according to HEVC. The partitions shown in the second row correspond to asymmetric partitions, where the two partitioned parts have different sizes.

After obtaining the residual block by the prediction process based on PU splitting type, the prediction residues of a CU can be partitioned into transform units (TU) according to another quadtree structure which is analogous to the coding tree for the CU as shown in FIG. 1. The solid lines indicate CU boundaries and dotted lines indicate TU boundaries. The TU is a basic representative block having residual or transform coefficients for applying the integer transform and quantization. For each TU, one integer transform having the same size to the TU is applied to obtain residual coefficients. These coefficients are transmitted to the decoder after quantization on a TU basis.

The terms coding tree block (CTB), coding block (CB), prediction block (PB), and transform block (TB) are defined to specify the 2-D sample array of one colour component associated with CTU, CU, PU, and TU, respectively. Thus, a CTU consists of one luma CTB, two chroma CTBs, and associated syntax elements. A similar relationship is valid for CU, PU, and TU. The tree partitioning is generally applied simultaneously to both luma and chroma, although exceptions apply when certain minimum sizes are reached for chroma.

Alternatively, the binary tree partitioning structure is proposed. In the disclosed partitioning process, a block can be split into 2 smaller blocks recursively. FIG. 3 shows different kinds of splitting types. The symmetric horizontal and vertical splitting are the most efficient and simplest ones (i.e., M/2×M and M×M/2), shown in the top two splitting types in FIG. 3. Therefore, as one embodiment, we only use these two splitting types.

FIG. 4 illustrates an example of block partitioning 410 and its corresponding binary tree 420. In each splitting node (i.e., non-leaf node) of the binary tree, one flag is used to indicate which splitting type (horizontal or vertical) is used, where 0 may indicate horizontal splitting and 1 may indicate vertical splitting.

The binary tree structure can be used for partitioning an image area into multiple smaller blocks such as partitioning a slice into CTUs, a CTU into CUs, a CU into PUs, or a CU into TUs, and so on. The binary tree can be used for partitioning a CTU into CUs, where the root node of the binary tree is a CTU and the leaf node of the binary tree is CU. The leaf nodes can be further processed by prediction and transform coding. For simplification, there is no further partitioning from CU to PU or from CU to TU, which means CU equal to PU and PU equal to TU. Therefore, in other words, the leaf node of the binary tree is the basic unit for prediction and transforms coding.

QTBT Structure

Binary tree structure is more flexible than quadtree structure since more partition shapes can be supported, which is also the source of coding efficiency improvement. However, the encoding complexity will also increase in order to select the best partition shape. In order to balance the complexity and coding efficiency, a method to combine the quadtree and binary tree structure, which is also called as quadtree plus binary tree (QTBT) structure, has been disclosed. According to the QTBT structure, a CTU (or CTB for I slice) is the root node of a quadtree and the CTU is firstly partitioned by a quadtree, where the quadtree splitting of one node can be iterated until the node reaches the minimum allowed quadtree leaf node size (i.e., MinQTSize). If the quadtree leaf node size is not larger than the maximum allowed binary tree root node size (i.e., Max BTSize), it can be further partitioned by a binary tree. The binary tree splitting of one node can be iterated until the node reaches the minimum allowed binary tree leaf node size (i.e., Min BTSize) or the maximum allowed binary tree depth (i.e., Max BTDepth). The binary tree leaf node, namely CU (or CB for I slice), will be used for prediction (e.g. Intra-picture or inter-picture prediction) and transform without any further partitioning. There are two splitting types in the binary tree splitting: symmetric horizontal splitting and symmetric vertical splitting. In the QTBT structure, the minimum allowed quadtree leaf node size, the maximum allowed binary tree root node size, the minimum allowed binary tree leaf node width and height, and the maximum allowed binary tree depth can be indicated in the high level syntax such as in SPS. FIG. 5 illustrates an example of block partitioning 510 and its corresponding QTBT 520. The solid lines indicate quadtree splitting and dotted lines indicate binary tree splitting. In each splitting node (i.e., non-leaf node) of the binary tree, one flag indicates which splitting type (horizontal or vertical) is used, 0 may indicate horizontal splitting and 1 may indicate vertical splitting.

The above QTBT structure can be used for partitioning an image area (e.g. a slice, CTU or CU) into multiple smaller blocks such as partitioning a slice into CTUs, a CTU into CUs, a CU into PUs, or a CU into TUs, and so on. For example, the QTBT can be used for partitioning a CTU into CUs, where the root node of the QTBT is a CTU which is partitioned into multiple CUs by a QTBT structure and the CUs are further processed by prediction and transform coding. For simplification, there is no further partitioning from CU to PU or from CU to TU. That means CU equal to PU and PU equal to TU. Therefore, in other words, the leaf node of the QTBT structure is the basic unit for prediction and transform.

An example of QTBT structure is shown as follows. For a CTU with size 128×128, the minimum allowed quadtree leaf node size is set to 16×16, the maximum allowed binary tree root node size is set to 64×64, the minimum allowed binary tree leaf node width and height both is set to 4, and the maximum allowed binary tree depth is set to 4. Firstly, the CTU is partitioned by a quadtree structure and the leaf quadtree unit may have size from 16×16 (i.e., minimum allowed quadtree leaf node size) to 128×128 (equal to CTU size, i.e., no split). If the leaf quadtree unit is 128×128, it cannot be further split by binary tree since the size exceeds the maximum allowed binary tree root node size 64×64. Otherwise, the leaf quadtree unit can be further split by binary tree. The leaf quadtree unit, which is also the root binary tree unit, has binary tree depth as 0. When the binary tree depth reaches 4 (i.e., the maximum allowed binary tree as indicated), no splitting is implicitly implied. When the block of a corresponding binary tree node has width equal to 4, non-horizontal splitting is implicitly implied. When the block of a corresponding binary tree node has height equal to 4, non-vertical splitting is implicitly implied. The leaf nodes of the QTBT are further processed by prediction (Intra picture or Inter picture) and transform coding.

For I-slice, the QTBT tree structure usually applied with the luma/chroma separate coding. For example, the QTBT tree structure is applied separately to luma and chroma components for I-slice, and applied simultaneously to both luma and chroma (except when certain minimum sizes being reached for chroma) for P- and B-slices. In other words, in an I-slice, the luma CTB has its QTBT-structured block partitioning and the two chroma CTBs have another QTBT-structured block partitioning. In another example, the two chroma CTBs can also have their own QTBT-structured block partitions.

High-Efficiency Video Coding (HEVC) is a new international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block, and each CU can be recursively split into four smaller CUs until the predefined minimum size is reached. Each CU contains one or multiple prediction units (PUs).

To achieve the best coding efficiency of hybrid coding architecture in HEVC, there are two kinds of prediction modes (i.e., Intra prediction and Inter prediction) for each PU. For Intra prediction modes, the spatial neighbouring reconstructed pixels can be used to generate the directional predictions. There are up to 35 directions in HEVC. For Inter prediction modes, the temporal reconstructed reference frames can be used to generate motion compensated predictions. There are three different modes, including Skip, Merge and Inter Advanced Motion Vector Prediction (AMVP) modes When a PU is coded in Inter AMVP mode, motion-compensated prediction is performed with transmitted motion vector differences (MVDs) that can be used together with Motion Vector Predictors (MVPs) for deriving motion vectors (MVs). To decide MVP in Inter AMVP mode, the advanced motion vector prediction (AMVP) scheme is used to select a motion vector predictor among an AMVP candidate set including two spatial MVPs and one temporal MVP. So, in AMVP mode, MVP index for MVP and the corresponding MVDs are required to be encoded and transmitted. In addition, the Inter prediction direction to specify the prediction directions among bi-prediction, and uni-prediction which are list 0 (i.e., L0) and list 1 (i.e., L1), accompanied with the reference frame index for each list should also be encoded and transmitted.

When a PU is coded in either Skip or Merge mode, no motion information is transmitted except for the Merge index of the selected candidate since the Skip and Merge modes utilize motion inference methods. Since the motion vector difference (MVD) is zero for the Skip and Merge modes, the MV for the Skip or Merge coded block is the same as the motion vector predictor (MVP) (i.e., MV=MVP+MVD=MVP). Accordingly, the Skip or Merge coded block obtains the motion information from spatially neighbouring blocks (spatial candidates) or a temporal block (temporal candidate) located in a co-located picture. The co-located picture is the first reference picture in list 0 or list 1, which is signalled in the slice header. In the case of a Skip PU, the residual signal is also omitted. To decide the Merge index for the Skip and Merge modes, the Merge scheme is used to select a motion vector predictor among a Merge candidate set containing four spatial MVPs and one temporal MVP.

FIG. 6 shows the neighbouring PUs used to derive the spatial and temporal MVPs for both AMVP and Merge scheme. In AMVP, the left MVP is the first available one from $A_0$, $A_1$, the top MVP is the first available one from $B_0$, $B_1$, $B_2$, and the temporal MVP is the first available one from $T_{BR}$ or $T_{CTR}$ ($T_{BR}$ is used first, if $T_{BR}$ is not available, $T_{CTR}$ is used instead). If the left MVP is not available and the top MVP is not scaled MVP, the second top MVP can be derived if there is a scaled MVP among $B_0$, $B_1$, and $B_2$. The list size of MVPs of AMVP is 2 in HEVC. Therefore, after the derivation process of the two spatial MVPs and one temporal MVP, only the first two MVPs can be included in the MVP list. If after removing redundancy, the number of available MVPs is less than two, zero vector candidates are added to the candidates list.

For Skip and Merge mode, as shown in FIG. 6, up to four spatial Merge index are derived from $A_0$, $A_1$, $B_0$ and $B_1$, and one temporal Merge index is derived from $T_{BR}$ or $T_{CTR}$ ($T_{BR}$ is used first, if $T_{BR}$ is not available, $T_{CTR}$ is used instead). Note that if any of the four spatial Merge index is not available, the position $B_2$ is then used to derive Merge index as a replacement. After the derivation process of the four spatial Merge index and one temporal Merge index, removing redundancy is applied to remove redundant Merge index. If after removing redundancy, the number of available Merge index is smaller than five, three types of additional candidates are derived and are added to the candidates list.

Additional bi-predictive Merge candidates are created by using original Merge candidates. The additional candidates are divided into three candidate types:

1. Combined bi-predictive Merge candidate (candidate type 1)
2. Scaled bi-predictive Merge candidate (candidate type 2)
3. Zero vector Merge/AMVP candidate (candidate type 3)

In candidate type 1, combined bi-predictive Merge candidates are created by combining original Merge candidate. In particular, two candidates in original candidates, which have mvL0 (the motion vector in list 0) and refIdxL0 (the reference picture index in list 0) or mvL1 (the motion vector in list 1) and refIdxL1 (the reference picture index in list 1), are used to created bi-predictive Merge candidates. FIG. 7 illustrates an example of the derivation process for combined bi-predictive Merge candidate. The candidate set 710 corresponds to an original candidate list, which includes mvL0_A, ref0 (731) in L0 and mvL1_B, ref (732) in L1. A bi-prediction MVP 733 can be formed by combining the candidates in L0 and L1 as indicated by the process 730 in FIG. 7.

In candidate type 2, scaled bi-predictive Merge candidates are created by scaling original Merge candidate. In particular, one candidate in original candidates, which have mvLX (the motion vector in list X) and refIdxLX (the reference picture index in list X), X can be 0 or 1, is used to created bi-predictive Merge candidates. For example, one candidate A is list 0 uni-predictive with mvL0_A and ref0, ref0 is firstly copied to reference index ref0' in list 1. After that, mvL0'_A is calculated by scaling mvL0_A with ref0 and ref0'. Then, bi-predictive Merge candidate which has mvL0_A and ref0 in list 0 and mvL0'_A and ref0' in list 1, is created and added into Merge candidate list. An example of the derivation process of the scaled bi-predictive Merge candidate is shown in FIG. 8A, where candidate list 810 corresponds to an original candidate list and candidate list 820 corresponds to the expanded candidate list including two generated bi-prediction MVPs as illustrated by process 830.

In candidate type 3, Zero vector Merge/AMVP candidates are created by combining zero vectors and reference index, which can be referred. FIG. 8B illustrates an example for adding zero vector Merge candidates, where candidate list 840 corresponds to an original Merge candidate list and candidate list 850 corresponds to the extended Merge candidate list by adding zero candidates. FIG. 8C illustrates an example for adding zero vector AMVP candidates, where candidate lists 860 (L0) and 862 (L1) correspond to original AMVP candidate lists and the candidate list 870 (L0) and 872 (L1) correspond to the extended AMVP candidate lists by adding zero candidates. If zero vector candidates are not duplicated, it is added to Merge/AMVP candidates list.

IBC Mode

Current picture referencing (CPR) or Intra block copy (IBC) has been proposed during the standardization of HEVC SCC extensions. It has been proved to be efficient for coding screen content video materials. The IBC operation is very similar to original Inter mode in video codec. However, the reference picture is the current decoded frame instead of previously coded frames. Some details of IBC can be found in JVET-K0076 (X. Xu, et al., "*CE8-2.2: Current picture referencing using reference index signaling*", Joint Video Experts Team (JVET) of ITU-T SG 16 WP 3 and ISO/IEC JTC 1/SC 29/WG 11, 11th Meeting: Ljubljana, SI, 10-18 Jul. 2018, Document: JVET-K0076) and a technical paper by Xu, et al. (X. Xu, et al., "*Intra Block Copy in HEVC Screen Content Coding Extensions*," IEEE J. Emerg. Sel. Topics Circuits Syst., vol. 6, no. 4, pp. 409-419, 2016).

The IBC coding mode requires reference samples from the current picture. In particular, the IBC coding of a current block often requires reference samples immediately above or to the left of the current block. Therefore, the IBC process of the current block has to wait until the neighbouring sample are fully processed and reconstructed, which imposes very tight constraints on hardware design. In order to make the IBC more hardware design friendly, it is desirable to develop techniques to overcome the issue.

BRIEF SUMMARY OF THE INVENTION

A method and apparatus of Inter prediction for video coding including IBC (Intra Block Copy) coding tool are disclosed. According to one method of the present invention, input data related to a current block in a current picture are received at a video encoder side or a video bitstream corresponding to compressed data including the current block in the current picture is received at a video decoder side. An IBC Merge candidate list is generated from Merge candidates associated with one or more candidate types, wherein one or more target candidates associated with a target candidate type are excluded from the IBC Merge candidate list when one or more constraints are satisfied. Current motion information associated with the current block is encoded using the IBC Merge candidate list at the video encoder side or the current motion information associated with the current block is decoded at the video decoder side using the IBC Merge candidate list.

In one embodiment, said one or more constraints correspond to block width of the current block, block height of the current block or a combination thereof. In another embodiment, said one or more constraints correspond to block area of the current block. The target candidate type corresponds to a spatial Merge candidate.

In one embodiment, the target candidate type corresponds to a spatial Merge candidate. In another embodiment, the target candidate type corresponds to a temporal Merge candidate. In yet another embodiment, the target candidate type corresponds to a history-based Merge candidate. In yet another embodiment, the target candidate type corresponds to a pairwise average Merge candidate. In yet another embodiment, the target candidate type corresponds to a SubCU Merge candidate. In yet another embodiment, the target candidate type corresponds to a default Merge candidate.

In one embodiment, a pruning process for the IBC Merge candidate list is skipped or simplified according to block width of the current block, block height of the current block or a combination thereof after a new candidate is added to the IBC Merge candidate list. In another embodiment, a pruning process for the IBC Merge candidate list is skipped or simplified according to block area of the current block after a new candidate is added to the IBC Merge candidate list.

According to another method, an IBC Merge candidate list is generated from Merge candidates associated with one or more candidate types, wherein a pruning process for the IBC Merge candidate list is skipped or simplified according to block width of the current block, block height of the current block, block area of the current block or a combination thereof after a new candidate is added to the IBC Merge candidate list.

BRIEF DESCRIPTION OF THE DRAWINGS

FIG. 8B illustrates an example of adding zero vector Merge candidates, where the candidate list on the left corresponds to an original Merge candidate list and the candidate list on the right corresponds to the extended Merge candidate list by adding zero candidates.

FIG. 8C illustrates an example for adding zero vector AMVP candidates, where the candidate lists on the top correspond to original AMVP candidate lists (L0 on the left and L1 on the right) and the candidate lists at the bottom correspond to the extended AMVP candidate lists (L0 on the left and L1 on the right) by adding zero candidates.

FIG. 9C to FIG. 9F illustrate examples of permitted band for a current CU according to embodiments of the present invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

While the Intra Block Coding (IBC) method has been shown to improve the coding performance, there exists processing dependence between a current block and its neighbouring reconstructed samples, which may slow down overall system performance. Accordingly, it is desired to develop methods that can alleviate the dependence issue and ease hardware design.

Method 1—Guard Band in IBC Mode

To make the IBC more hardware design friendly, the guard band method is proposed according to one embodiment of the present invention. When the IBC mode is coded, it can have a guard band. The guard band is a region in the current picture that the motion vector of IBC cannot point to. In other words, the required pixels of the reference block, including some extra pixels for Interpolation filter, for the reference block pointed by the motion vector of IBC cannot include pixels in the guard band. Another term, "permitted band" can be defined as the inverse of guard band.

The "permitted band" is the region of pixels in the current picture and not belonging to the guard band. The "permitted band" can also be defined as: "the required reference block pixels (including some extra pixels for Interpolation filter) for reference block pointed by the motion vector of IBC that must be all inside the permitted band. The terms "guard band" and "permitted band" with proper conditions may be used interchangeably in this disclosure. For example, the phrase "reference samples outside a guard band of the current block" is equivalent to the phrase " " samples inside a permitted band of the current block.

There are two types of guard band or permitted band including near-current-CU guard band and far-current-CU guard band (also named near-current-CU permitted band).

Near-Current-CU Guard Band

Figure 1:
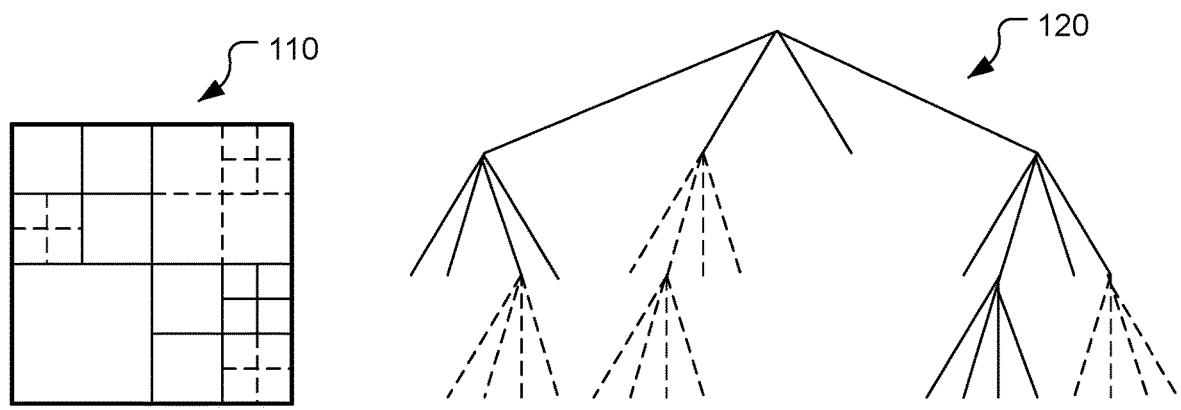
FIG. 1 illustrates an example of block partition using quadtree structure to partition a coding tree unit (CTU) into coding units (CUs).
Figure 2:
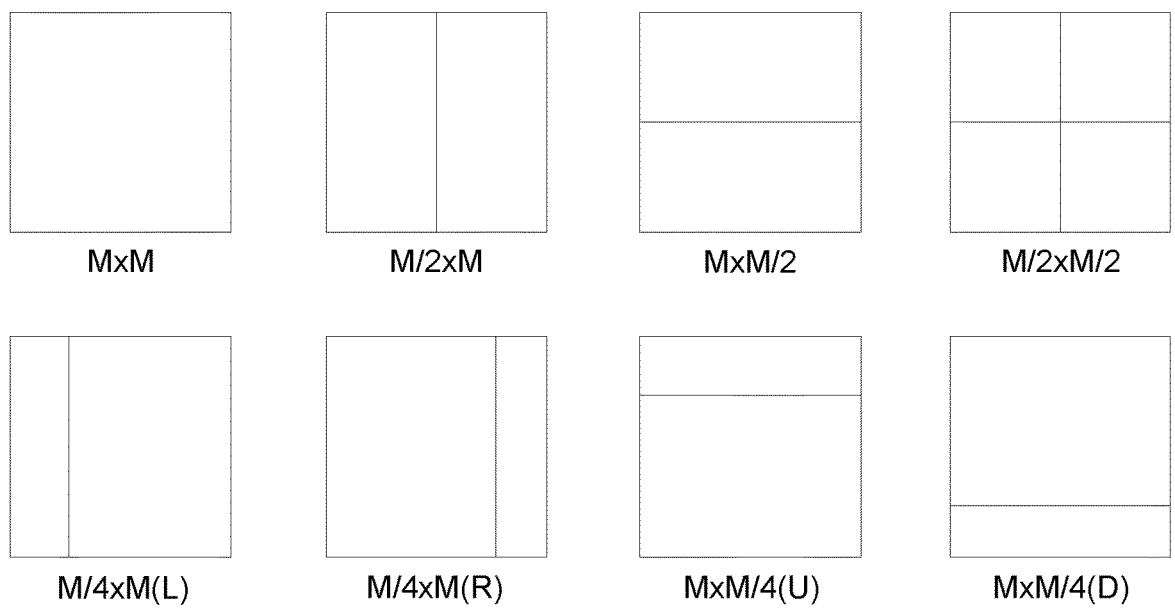
FIG. 2 illustrates asymmetric motion partition (AMP) according to High Efficiency Video Coding (HEVC), where the AMP defines eight shapes for splitting a CU into PU.
Figure 3:
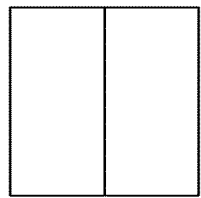
FIG. 3 illustrates an example of various binary splitting types used by a binary tree partitioning structure, where a block can be recursively split into two smaller blocks using the splitting types.
Figure 3:
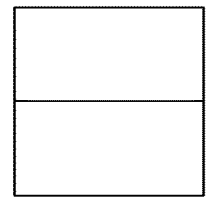
Figure 3:
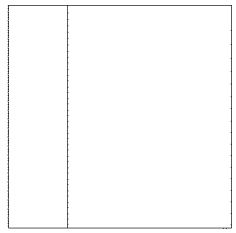
Figure 3:
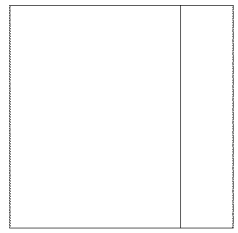
Figure 3:
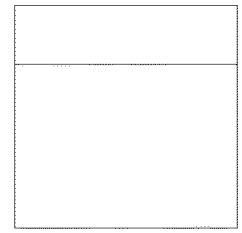
Figure 3:
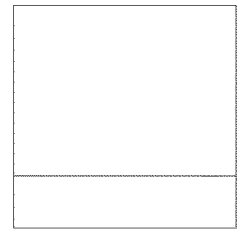
Figure 4:
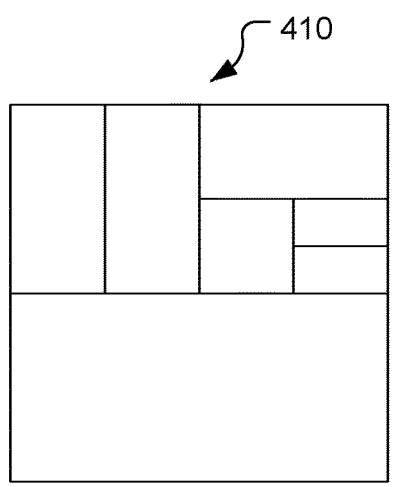
FIG. 4 illustrates an example of block partitioning and its corresponding binary tree, where in each splitting node (i.e., non-leaf node) of the binary tree, one syntax is used to indicate which splitting type (horizontal or vertical) is used, where 0 may indicate horizontal splitting and 1 may indicate vertical splitting.
Figure 4:
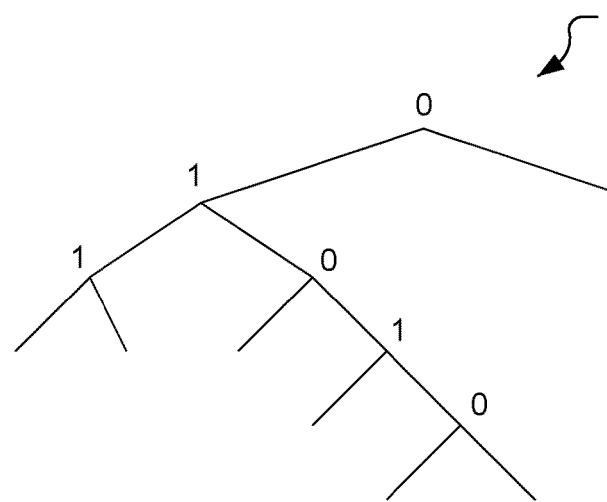
Figure 5:
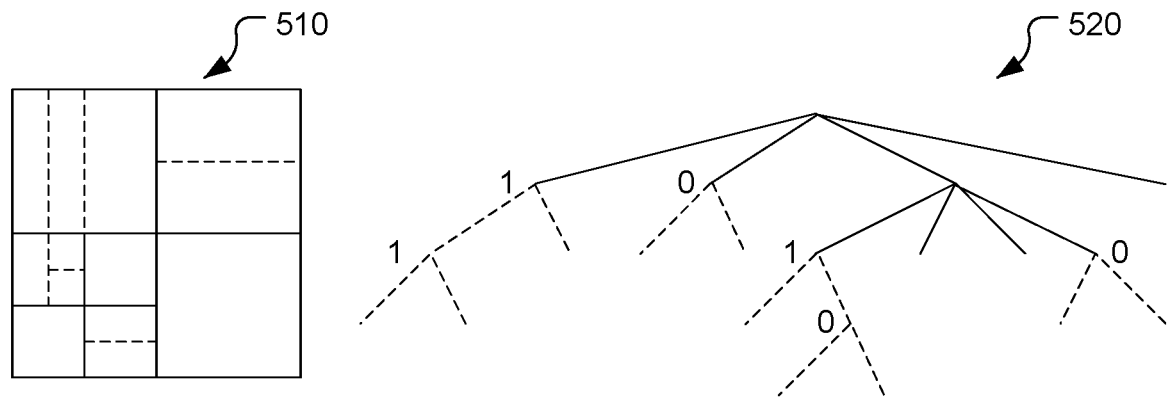
FIG. 5 illustrates an example of block partitioning and its corresponding QTBT, where the solid lines indicate quadtree splitting and dotted lines indicate binary tree splitting.
Figure 6:
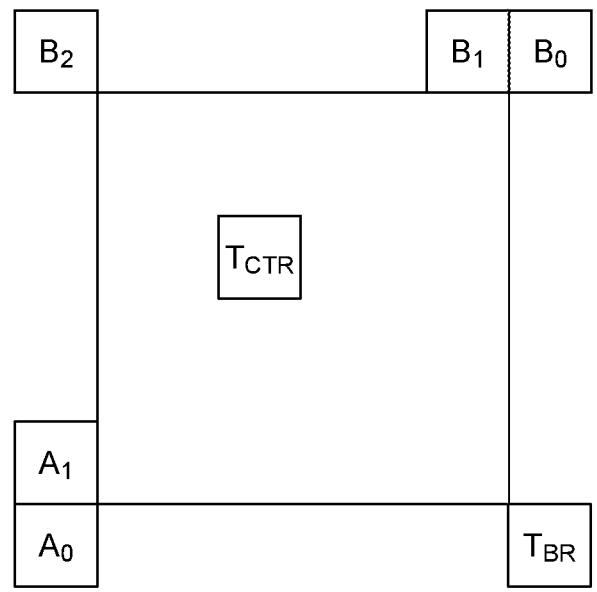
FIG. 6 shows the neighbouring PUs used to derive the spatial and temporal MVPs for both AMVP and Merge scheme.
Figure 7:
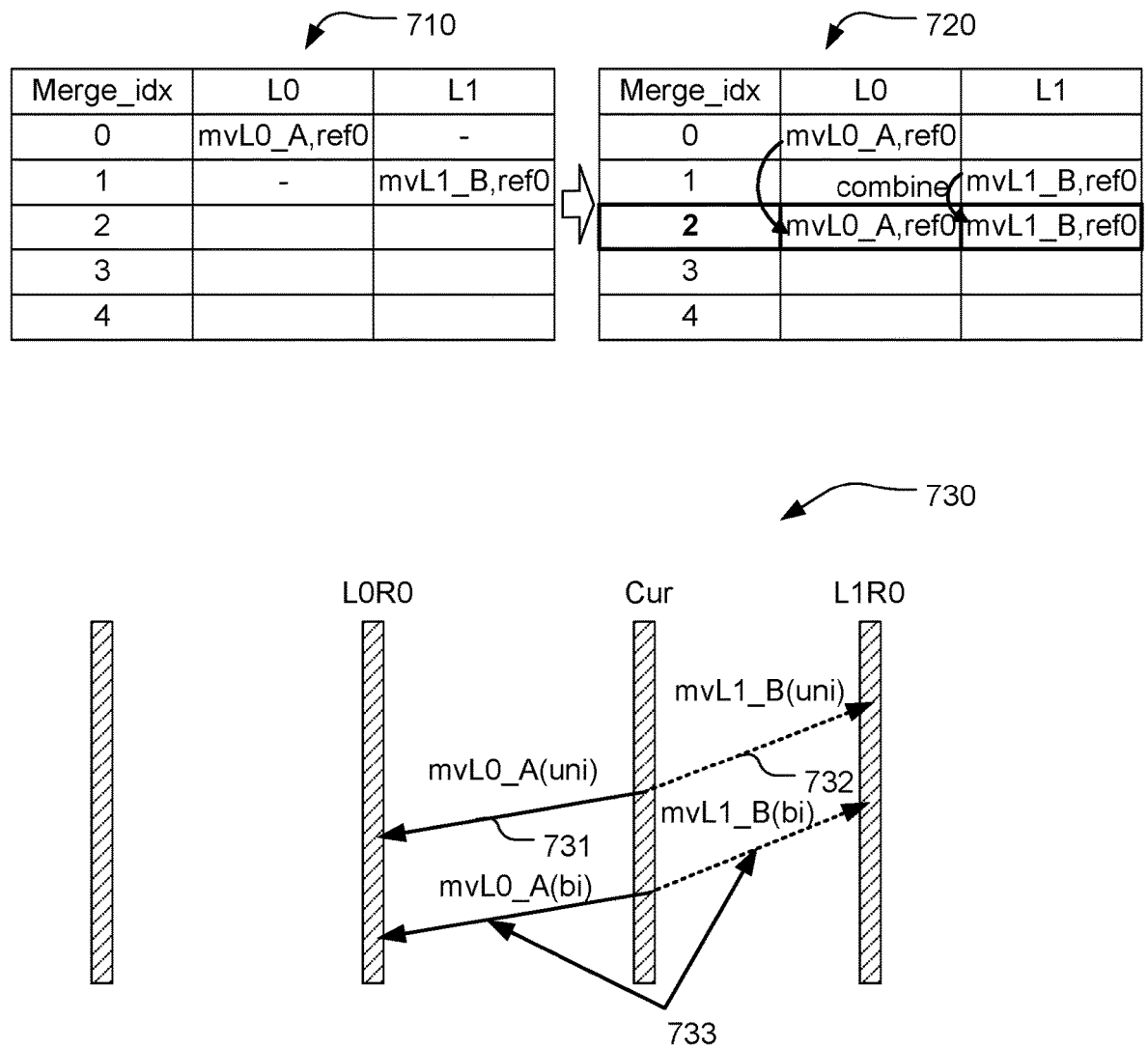
FIG. 7 illustrates an example of the derivation process for combined bi-predictive Merge candidate.
Figure 8A:
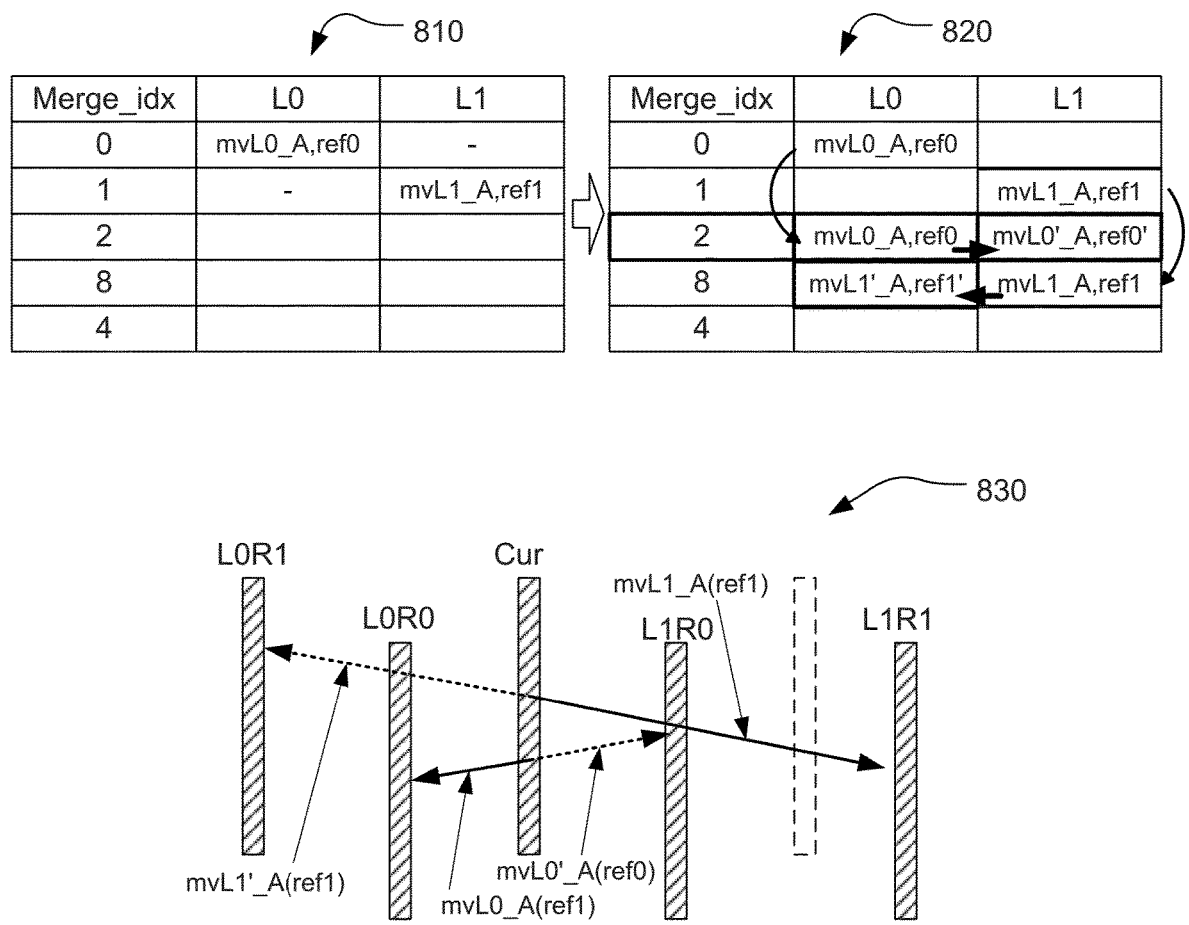
FIG. 8A illustrates an example of the derivation process of the scaled bi-predictive Merge candidate, where candidate list on the left corresponds to an original candidate list and the candidate list on the right corresponds to the expanded candidate list including two generated bi-prediction MVPs.
Figure 9A:
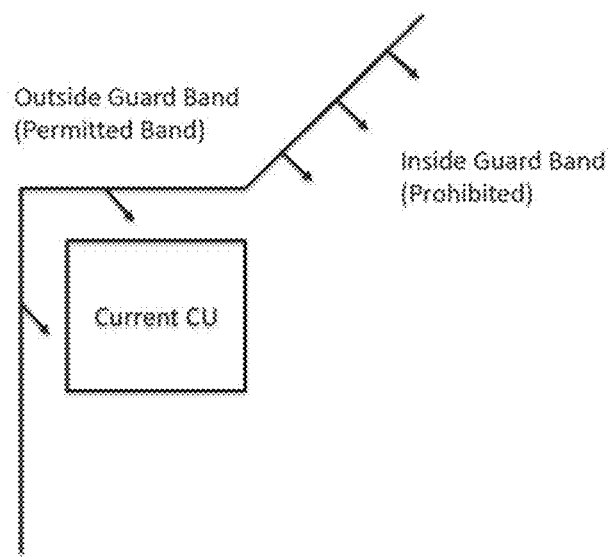
FIG. 9A and FIG. 9B illustrate examples of guard band or permitted band according to embodiments of the present invention, where the region pixels marked "inside guard band" are the region of guard band, and the region not belonging the guard band is the "permitted band.
Figure 9B:
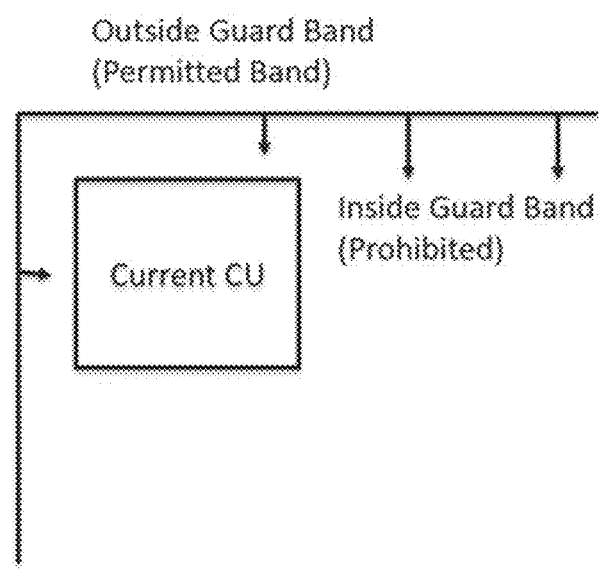

In the near-current-CU guard band, the region pixels near the current CU are prohibited from being used as reference pixels. Some examples of near-current-CU guard band are shown in FIG. 9A and FIG. 9B, where the region pixels marked "inside guard band" are the region of guard band, and the region not belonging the guard band is the "permitted band. The "permitted band" is the permitted region for the required block pixels, including some extra pixels for interpolation filter, for the reference block pointed by the motion vector of IBC. The "permitted band" corresponds to a region that MV of IBC mode can point to.

Note that, FIG. 9A and FIG. 9B are only examples of the near-current-CU guard band. The present invention is not limited to these examples. The proposed "near-current-CU guard band" may be any pixels region that is closer to the current CU.

Far-Current-CU Guard Band (or Near-Current-CU Permitted Band)

Figure 9C:
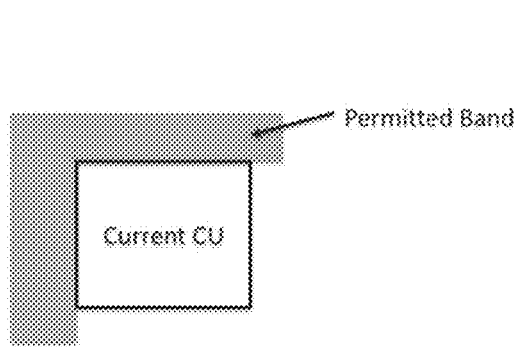
Figure 9D:
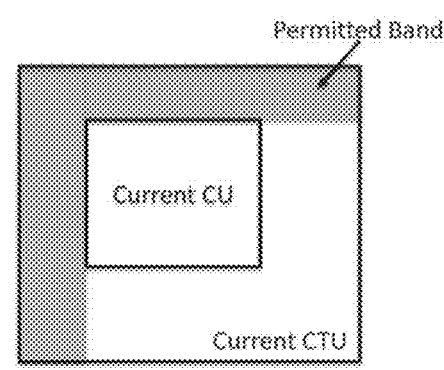

In the proposed far-current-CU guard band, the region pixels far away from the current CU are prohibit for reference pixels. Some examples of far-current-CU guard band are shown as follows. In FIG. 9C, some pixel lines (a grey rectangular area) above the current CU and some pixel columns (a grey rectangular area) on the left of the current CU are marked as the permitted band. Any pixel not belonging to permitted band is categorized as the far-current-CU guard band. In FIG. 9D, the pixels above the current CU (but inside the current CTU) are marked as permitted band, and the left neighbouring pixels of the current CU (but inside the current CTU) are marked as the permitted band. Any pixel not belonging to the permitted band is categorized as the far-current-CU guard band. In FIG. 9E, the permitted band is the permitted band of FIG. 9D added by a previous CTU. Any pixel not belonging to permitted band is categorized as the far-current-CU guard band. In FIG. 9F, the permitted band is the permitted band of FIG. 9D added by some pixel columns inside the previous CTU. Any pixel not belonging to permitted band is categorized as the far-current-CU guard band.

Another very important permitted band embodiment is the VVC style IBC mode permitted band. In VVC style IBC mode, the reference sample for the current picture has an important band constraint as shown in the previous description.

Note that the figures shown above are intended for illustrating examples of the far-current-CU guard band. This invention is not limited to the examples. The proposed "far-current-CU guard band" may be any pixel region that is far away from the current CU.

Method 2—Merge Mode Enhancement Related to Guard Band of IBC

In order to improve the coding gain of IBC under guard band restriction, some new methods of Merge mode enhancement related to guard band of IBC are proposed.

Note that, all the described sub-methods in the following parts can be turned ON/OFF according to the current CU size or the shared parent CU size. In other words, if the current CU size or the shared parent CU size is larger than one predefined threshold, one of the sub-methods can be turned off (i.e., disabled). In another embodiment, if the current CU size or the shared parent CU size is smaller than one predefined threshold, one of the sub-methods can be turned off (i.e., disabled).

Method 2.1—Merge Candidate Removal According to the Guard Band or Permitted Band In this proposed method, it removes any Merge candidate where the reference CU is not inside the permitted band. In other words, the reference CU is partially inside the guard band. For example, if the Merge list for the IBC has 3 candidates (e.g. candidate 0, candidate 1 and candidate 2) and MV of candidate 0 is not inside the permitted band, the candidate 0 is removed from the Merge list or be treated as unavailable.

Method 2.2—Adjusted Default (i.e., Generated) Candidate

For a conventional Merge mode, when the number of the candidates of the Merge list is lower than the maximum Merge list candidate number, some "generated candidates" of zero MV may be added to the Merge list. These generated candidates are named as "Default Candidate" or "Generated Candidate". When the Merge mode of IBC with guard band is being processed, the default candidate is implicitly changed to be inside the permitted band according to an embodiment of the present invention.

In the proposed method, for IBC with Guard band, if the default candidate is not inside the permitted band, the default candidate will be adjusted to be inside the permitted band. There are various embodiments as shown below.

Embodiment 2.2.1—Only horizontal part of the MV is adjusted, such as directly adding the MV_x by a value, so that the modified candidate can be inside the permitted band.

Embodiment 2.2.2—only vertical part of the MV is adjusted, such as directly adding the MV_y by a value, so that the modified candidate can be inside the permitted band.

Embodiment 2.2.3—This embodiment is a multiple-default-candidates method. In this method, it inserts multiple default candidates into Merge list, each default candidate has its own generating rule so that the modified candidate can be inside the permitted band. In one example, (MV_x+constant) is an adjusted default candidate. In another example, MV_y+constant) is an adjusted default candidate. In yet another example, (MV_x+constant1, MV_y+constant2) is an adjusted default candidate.

Embodiment 2.2.4—In this embodiment, it directly scales one of Merge candidates to be inside the permitted band. The MV scaling is to multiply (MVx, MVy) by a pre-defined constant for one (e.g. candidate 0) of Merge candidates. The scaled candidate is then inserted into Merge list.

The adjustment method of the default candidates is not limited to the exemplary embodiments shown above. Any method to adjust the default candidates due to the guard band of IBC can be used.

Method 3—AMVP Enhancement Related to Guard Band or Permitted Band of IBC

In order to improve the coding gain of IBC under guard band restriction, some new methods of AMVP mode enhancement related to guard band of IBC are proposed.

Method 3.1—Adjusted Default Candidate

Conventionally, when the number of the candidates of the AMVP list is lower than the maximum number of candidates in AMVP list, some "generated candidates" of zero MV may be added to the AMVP list. In IBC with guard band, if the default (i.e., generated) AMVP candidate is not inside the permitted band, the default candidate will be adjusted to be inside the permitted band or near the boundary between the permitted band and guard band. There are various embodiments as shown below.

Embodiment 3.1.1—Only horizontal part of the MV is adjusted, such as directly adding the MV_x by a value, so that the modified candidate can be inside the permitted band or near the boundary between the permitted band and guard band. The boundary between the permitted band and guard band is also referred as the boundary of the permitted band.

Embodiment 3.1.2—Only vertical part of the MV is adjusted, such as directly adding the MV_y by a value, so that the modified candidate can be inside the permitted band or near the boundary between the permitted band and guard band.

Embodiment 3.1.3—This embodiment is a multiple-default-candidates method. It inserts multiple default candidates into AMVP list, where each default candidate has its own generating rule. For example, the generated method of default candidate 0 may be (MV_x+constant), and the generated method of default candidate 1 may be (MV_y+constant), and the generated method of default candidate 2 may be (MV_x+constant1, MV_y+constant2).

Embodiment 3.1.4—It directly scales one of AMVP candidates to be inside the permitted band or near the boundary between the permitted band and guard band. In this embodiment, it directly scales one (e.g. candidate 0) of AMVP candidates to adjust it to be inside the permitted band or near the boundary between the permitted band and guard band. The scaled candidate is then inserted into AMVP list. The scaling can be done by multiplying (MVx, MVy) by a pre-defined constant.

The adjustment method of the default candidates is not limited to the exemplary embodiments shown above. Any method to adjust the default candidates due to the guard band of IBC can be used.

Method 3.2—Candidate Removal According to the Guard Band or Permitted Band

In this proposed method, it removes any AMVP candidate, where the reference CU is not inside the permitted band or inside the guard band with a large distance between the reference CU and the "boundary between permitted band and guard band". For example, if the AMVP list for IBC has 3 candidates (e.g. candidate 0, candidate 1 and candidate 2), MV of candidate 0 is not inside the permitted band or inside the guard band with large distance between the reference CU and the "boundary between permitted band and guard band", the candidate 0 is removed from the AMVP list or treated as unavailable.

Method 3.3—Candidate Reorder According to the Guard Band or Permitted Band

In this proposed method, it reorders the order of AMVP candidates in the candidate list according to the guard band. That is, it reorders the AMVP candidates according to whether the candidate is in the guard band, or in the permitted band, or it is close to the "boundary between permitted band and guard band". If the candidate is out of the permitted band, it is preferred to reorder this candidate to a later position in candidate list. If the candidate is inside the permitted band, it is preferred to reorder this candidate to a front position in candidate list. For 2 candidates which are both out of the permitted band, it is preferred to reorder the "closer to the permitted band" candidate to be before the "far away from permitted band" candidate in the candidate list.

Method 3.4—MVD Subtraction by the Guard Band or Permitted Band

In IBC with guard band, a method named "MVD subtraction by the guard band" is proposed. In the AMVP mode, the reference CU of the current MV predictor (i.e., an AMVP candidate in the AMVP candidate list) may be inside the guard band. In this case, it can subtract the MVD by a value (e.g. subtracting the horizontal part of the MVD, or vertical part of the MVD, or both). This subtraction value is related to the distance from the current CU to the guard band boundary (i.e., boundary between guard band and permitted band). Some examples of "MVD subtraction by the guard band" are shown in FIG. 10A and FIG. 10B.

Figure 10A:
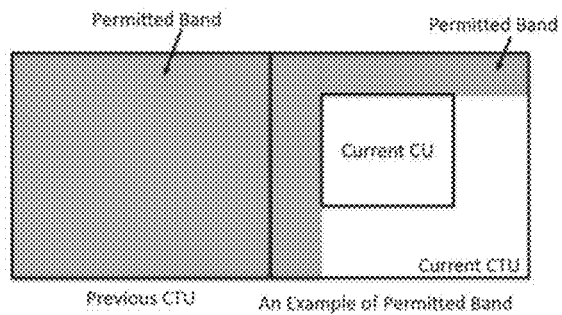
FIG. 10A illustrates an example of "MVD subtraction by the guard band" according to an embodiment of the present invention, where the position of reference CU is on the left side of the guard band and the MVD subtraction is a horizontal part subtraction.
Figure 10A:
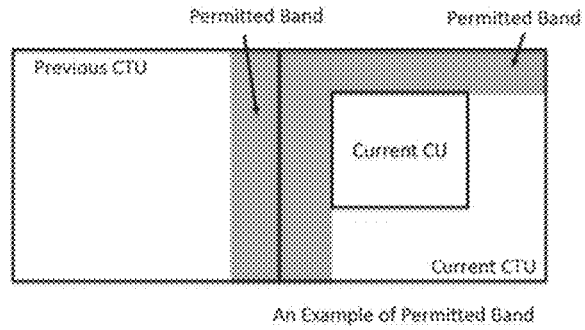
Figure 10A:
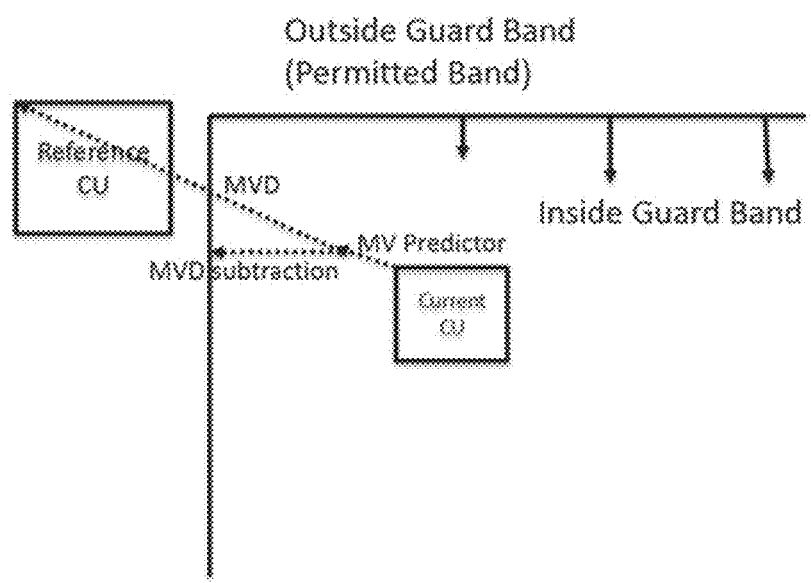

In FIG. 10A, the position of reference CU is on the left side away from the guard band. The reference CU may be larger than the current CU due to the need of extra pixels for fractional pixel Interpolation. The MVD subtraction (as shown in FIG. 10A) is a horizontal part subtraction, i.e., sent-MVD=(mvd_$x$–"MVD subtraction value", mvd_$y$).

The MVD subtraction design can cause the sent bit-rate of MVD (i.e., sent-MVD) shorter, so as to improve the coding gain. Decoder can add the "MVD subtraction value" from the received MVD to reconstruct the original MVD.

Figure 10B:
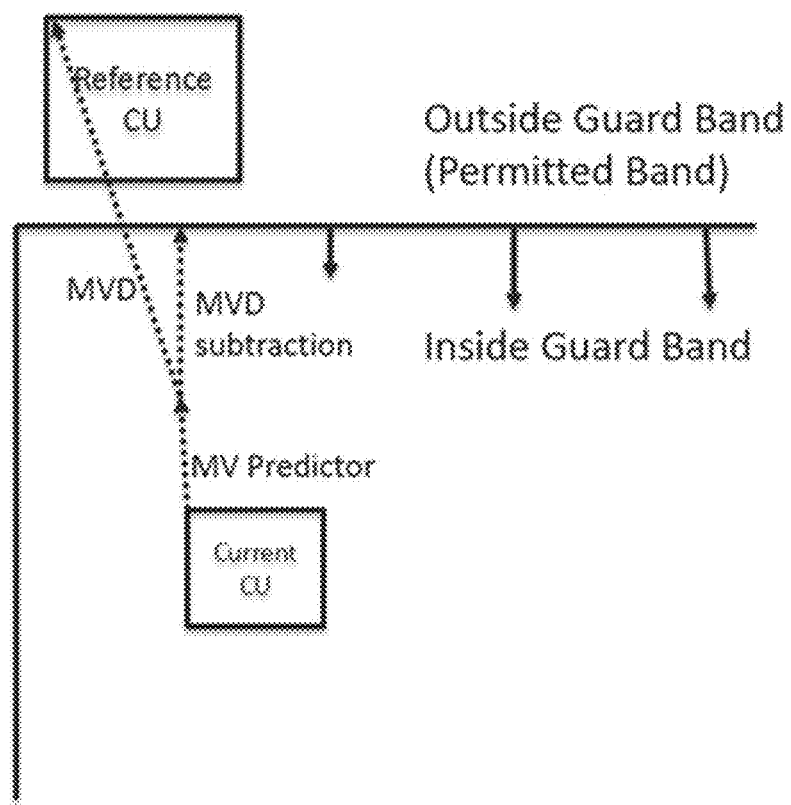
FIG. 10B illustrates an example of "MVD subtraction by the guard band" according to an embodiment of the present invention, where the position of reference CU is on the top side of the guard band and the MVD subtraction is a horizontal part subtraction.

In FIG. 10B, the position of reference CU Inter is on the top side away from guard band. The MVD subtraction (as shown in FIG. 10B) is a vertical part subtraction, i.e., sent-MVD=(mvd_$x$,mvd_$y$–"MVD subtraction value").

The MVD subtraction design can cause the sent bit-rate of MVD (i.e., sent-MVD) shorter, so as to improve the coding gain. Decoder can add the "MVD subtraction value" from the received MVD to reconstruct the original MVD.

The MVD subtraction mode (i.e., subtracting the horizontal part or vertical part or both) can be signalled in picture header, or slice header, or CTU level, or CU level. In another embodiment, it can also be pre-defined as all-horizontal-part-subtraction in a video coding system. In another embodiment, it can also be pre-defined as all-vertical-part-subtraction in a video coding system.

Method 3.5—MVD Sign Prediction by the Guard Band or Permitted Band

In IBC with guard band or permitted band, a method named "MVD sign prediction by the guard band" is proposed. In the proposed method, the sent_sign_bits of MVD can be saved or reduced by using the information of the guard band. In other words, the decoder may receive the MVD without sign information, with only partial sign information, or with transformed sign information (e.g. transformed into other information, and decoded as correct sign according to some guard band information). According to the guard band position and distance related to the current CU and MV predictor magnitude, the correct sign can be implicitly judged in the decoder. In another embodiment, the correct sign can be derived according to the guard band position and distance related to the current CU and MV predictor magnitude and the partial sign information sent from encoder. In another embodiment, the correct sign can be derived according to the guard band position and distance related to the current CU and MV predictor magnitude and the transformed sign information sent from encoder. In the above, methods of reducing bit rate for MVD signalling are disclosed by signalling information of the MVD without sign information or with reduced sign information by utilizing other information related to MVD. For example, the other information of MVD includes the guard band position and distance related to the current CU and MV predictor magnitude the guard band position and distance related to the current CU and MV predictor magnitude.

Figure 10C:
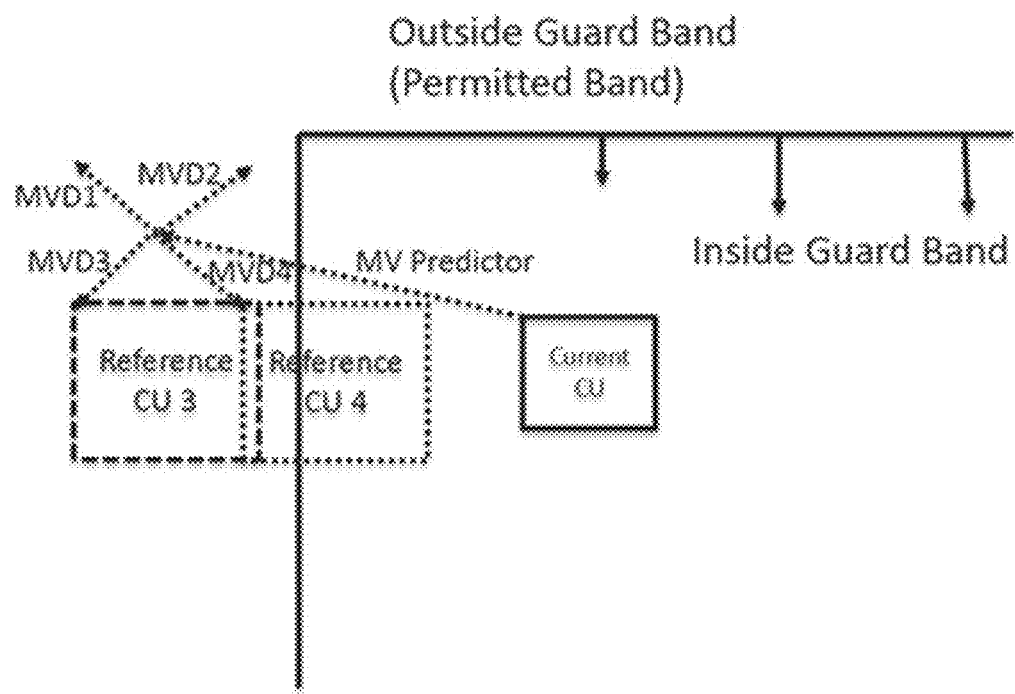
FIG. 10C illustrates an example of decoding the MVD without sign information or with reduced sign information of the MVD according to an embodiment of the present invention.

One example is shown in FIG. 10C. In this case, the encoder only sends the MVD sign of vertical direction, but no MVD sign of horizontal direction, to the decoder. In the FIG. 10C, MVD1, MVD2, MVD3 and MVD4 all have the same MVD_x magnitude and MVD_y magnitude, but with all different sign of x and sign of y. Decoder can easily derive the MVD sign of horizontal direction. In FIG. 10C, since MVD2 and MVD4 violate the guard band restriction, the MVD2 and MVD4 are not correct. Therefore, the decoder can easily judge the sign of horizontal to be negative (i.e., MVD motion vector horizontal part being negative).

To avoid the parsing issue, in one embodiment, for sending sign information from encoder to decoder, it can keep 2 bits for MVD sign bits for one MVD, but now it is a transformed (transformed into other information, and decoded as correct sign by some guard band information) sign information. When decoder receives the 2 bits sign information, it can build 4 sign candidates (as MVD1, MVD2, MVD3, MVD4, one example is shown in FIG. 10C), and then remove some candidates (e.g., candidates violating the guard band as being not fully inside the permitted band), then, among the remaining candidates, the final candidate can be selected as indicated by the 2 bits sign information.

There are several sign transformation methods. In this method, some candidates among the 4 sign candidates (e.g. MVD1, MVD2, MVD3 and MVD4 as shown in FIG. 10C) are removed by the guard band. Then, the remaining candidates are assigned an increasing index starting from 0. Then, the index is signalled (2 bits) from encoder to decoder.

In IBC Merge mode, several types of Merge candidate will be inserted into Merge list if the candidate exists. For example, spatial Merge candidate, temporal Merge candidate, history-based Merge candidate, pairwise average Merge candidate, SubCU Merge candidate or default Merge candidate can be inserted into the Merge list and be pruned during the pruning process. In IBC Merge mode, Merge list construction can be simplified by excluding some Merge candidates or reducing pruning process. This method can be also applied to shared Merge mode when generating the IBC Merge mode on the shared boundary. This method can be applied according to some constraints.

In one embodiment, in IBC Merge mode, one or more spatial Merge candidates can be excluded from the Merge candidate list construction.

In another embodiment, in IBC Merge mode, one or more temporal Merge candidates can be excluded from the Merge candidate list construction.

In another embodiment, in IBC Merge mode, one or more history-based Merge candidates are excluded from the Merge candidate list construction.

In another embodiment, in IBC Merge mode, one more pairwise average Merge candidates are excluded from the Merge candidate list construction.

In another embodiment, in IBC Merge mode, one or more SubCU Merge candidates are excluded from the Merge candidate list construction.

In another embodiment, in IBC Merge mode, a default Merge candidate is excluded from the Merge candidate list construction.

In another embodiment, in IBC Merge mode, pruning process of spatial Merge candidate is not performed for the Merge candidate list construction. In another embodiment, the pruning process for the Merge candidate list construction is simplified.

In another embodiment, in IBC Merge mode, pruning process of temporal Merge candidate is not performed for the Merge candidate list construction. In another embodiment, the pruning process is simplified for the Merge candidate list construction.

In another embodiment, in IBC merge mode, pruning process of history-based Merge candidate is not performed for the Merge candidate list construction. In another embodiment, the pruning process for the Merge candidate list construction is simplified.

In another embodiment, in IBC Merge mode, pruning process of pairwise average Merge candidate is not performed for the Merge candidate list construction. In another embodiment, the pruning process for the Merge candidate list construction is simplified.

In another embodiment, in IBC Merge mode, pruning process of SubCU Merge candidate is not performed for the Merge candidate list construction. In another embodiment, the pruning process for the Merge candidate list construction is simplified.

In another embodiment, in IBC Merge mode, pruning process of default Merge candidate is not performed for the Merge candidate list construction. In another embodiment, the pruning process for the Merge candidate list construction is simplified.

In another embodiment, in IBC Merge mode, one or more spatial Merge candidates are excluded from the Merge candidate list construction according to the CU width or height.

In another embodiment, in IBC Merge mode, one or more temporal Merge candidates are excluded from the merge candidate list construction according to the CU width or height.

In another embodiment, in IBC Merge mode, one or more history-based Merge candidates are excluded from the merge candidate list construction according to the CU width or height.

In another embodiment, in IBC Merge mode, one or more pairwise average Merge candidates are excluded from the Merge candidate list construction according to the CU width or height.

In another embodiment, in IBC Merge mode, one or more SubCU Merge candidates are excluded from the merge candidate list construction according to the CU width or height.

In another embodiment, in IBC Merge mode, one or more default Merge candidates are excluded from the Merge candidate list construction according to the CU width or height.

In another embodiment, in IBC Merge mode, pruning process is not performed for the Merge candidate list construction according to the CU width or height. In another embodiment, the pruning process for the Merge candidate list construction is simplified.

In another embodiment, in IBC Merge mode, one or more spatial merge candidates are excluded from the Merge candidate list construction according to the CU area.

In another embodiment, in IBC Merge mode, one or more temporal Merge candidates are excluded from the Merge candidate list construction according to the CU area.

In another embodiment, in IBC Merge mode, one or more history-based Merge candidates are excluded from the Merge candidate list construction according to the CU area.

In another embodiment, in IBC Merge mode, one or more pairwise average Merge candidates are excluded from the Merge candidate list construction according to the CU area.

In another embodiment, in IBC Merge mode, one or more SubCU Merge candidates are excluded from the Merge candidate list construction according to the CU area.

In another embodiment, in IBC Merge mode, default Merge candidates are excluded from the Merge candidate list construction according to the CU area.

In another embodiment, in IBC Merge mode, pruning process is not performed for the Merge candidate list construction according to the CU area. In another embodiment, the pruning process for the Merge candidate list construction is simplified.

Any of the foregoing proposed methods can be implemented in encoders and/or decoders. For example, any of the proposed methods can be implemented in a predictor derivation module of an encoder, and/or a predictor derivation module of a decoder. Alternatively, any of the proposed methods can be implemented as a circuit coupled to the predictor derivation module of the encoder and/or the predictor derivation module of the decoder, so as to provide the information needed by the predictor derivation module.

Figure 11:
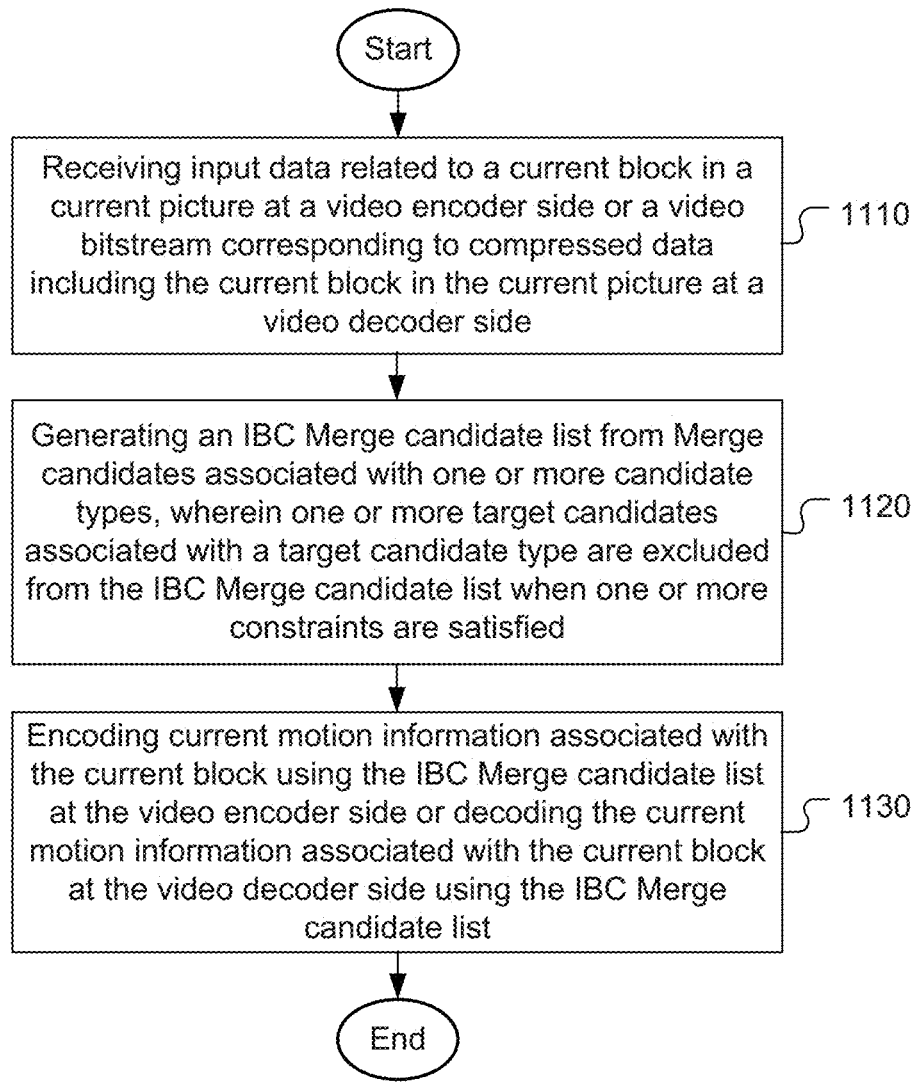
FIG. 11 illustrates a flowchart of an exemplary coding system with the IBC (Intra Block Copy) coding tool according to an embodiment of the present invention.

FIG. 11 illustrates a flowchart of an exemplary coding system with the IBC (Intra Block Copy) coding tool according to an embodiment of the present invention. The steps shown in the flowchart, as well as other following flowcharts in this disclosure, may be implemented as program codes executable on one or more processors (e.g., one or more CPUs) at the encoder side and/or the decoder side. The steps shown in the flowchart may also be implemented based hardware such as one or more electronic devices or processors arranged to perform the steps in the flowchart. According to this method, input data related to a current block in a current picture are received at a video encoder side or a video bitstream corresponding to compressed data including the current block in the current picture are received at a video decoder side are received in step 1110. An IBC Merge candidate list is generated from Merge candidates associated with one or more candidate types in step 1120, wherein one or more target candidates associated with a target candidate type are excluded from the IBC Merge candidate list when one or more constraints are satisfied. Current motion information associated with the current block is encoded using the IBC Merge candidate list at the video encoder side or the current motion information associated with the current block is decoded at the video decoder side using the IBC Merge candidate list in step 1130.

Figure 12:
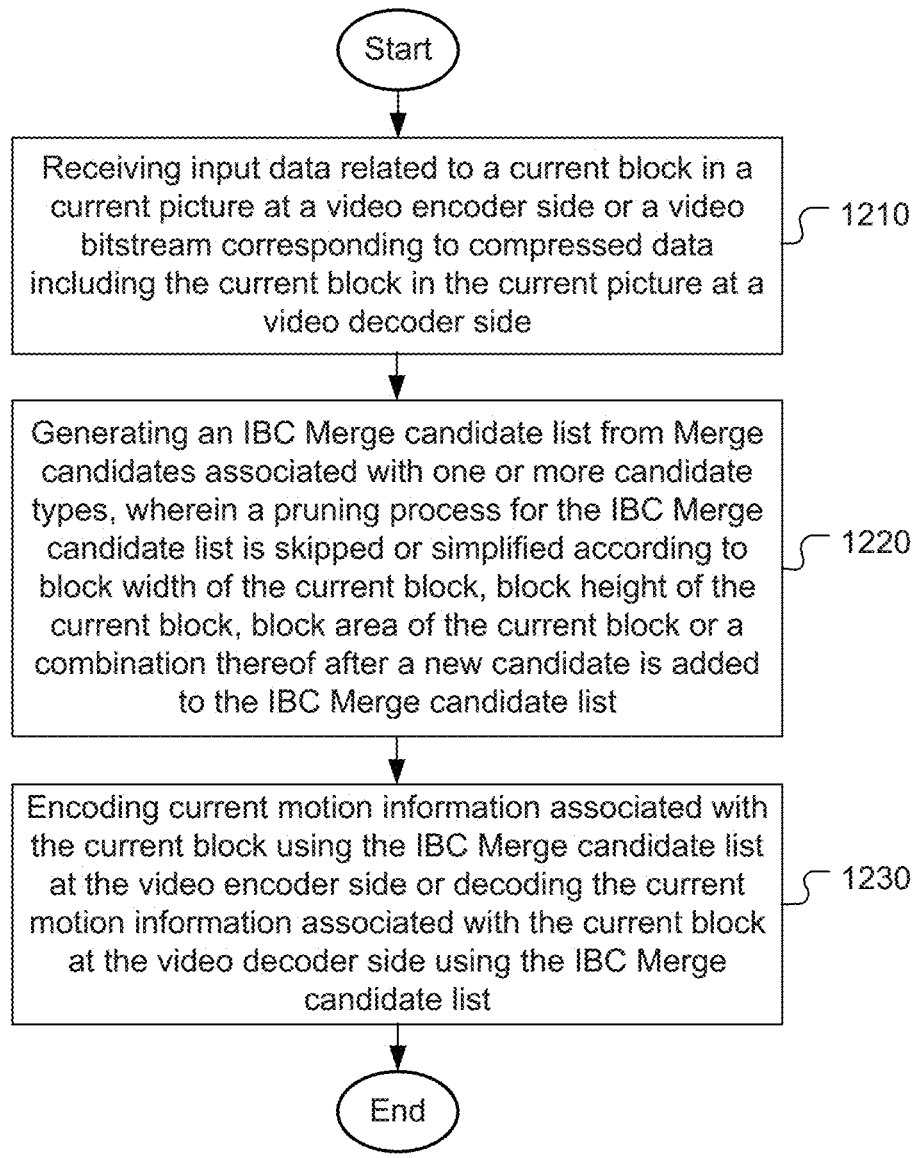
FIG. 12 illustrates a flowchart of another exemplary coding system with the IBC (Intra Block Copy) coding tool according to an embodiment of the present invention.

FIG. 12 illustrates a flowchart of another exemplary coding system with the IBC (Intra Block Copy) coding tool according to an embodiment of the present invention. According to this method, input data related to a current block in a current picture are received at a video encoder side or a video bitstream corresponding to compressed data including the current block in the current picture are received at a video decoder side are received in step 1210. An IBC Merge candidate list is generated from Merge candidates associated with one or more candidate types in step 1220, wherein a pruning process for the IBC Merge candidate list is skipped or simplified according to block width of the current block, block height of the current block, block area of the current block or a combination thereof after a new candidate is added to the IBC Merge candidate list. Current motion information associated with the current block is encoded using the IBC Merge candidate list at the video encoder side or the current motion information associated with the current block is decoded at the video decoder side using the IBC Merge candidate list in step 1230.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A prediction method for video coding based on IBC (Intra Block Copy) coding tool, the method comprising:
   receiving input data related to a current block in a current picture at a video encoder side or a video bitstream corresponding to compressed data including the current block in the current picture at a video decoder side;
   generating an IBC Merge candidate list from Merge candidates associated with one or more candidate types, wherein one or more target candidates associated with a first candidate type are excluded from the IBC Merge candidate list when one or more constraints are satisfied; and
   encoding current motion information associated with the current block using the IBC Merge candidate list at the video encoder side or decoding the current motion information associated with the current block at the video decoder side using the IBC Merge candidate list,
   wherein a pruning process for the IBC Merge candidate list is skipped or simplified according to block width of the current block, block height of the current block or a combination thereof when adding a new candidate associated with a second candidate type into the IBC Merge candidate list.

2. The method of claim 1, wherein said one or more constraints correspond to block width of the current block, block height of the current block or a combination thereof.

3. The method of claim 2, wherein the first candidate type corresponds to a spatial Merge candidate.

4. The method of claim 1, wherein said one or more constraints correspond to block area of the current block.

5. The method of claim 4, wherein the first candidate type corresponds to a spatial Merge candidate.

6. The method of claim 1, wherein the first candidate type corresponds to a spatial Merge candidate.

7. The method of claim 1, wherein the first candidate type corresponds to a temporal Merge candidate.

8. The method of claim 1, wherein the first candidate type corresponds to a history-based Merge candidate.

9. The method of claim 1, wherein the first candidate type corresponds to a pairwise average Merge candidate.

10. The method of claim 1, wherein the first candidate type corresponds to a SubCU Merge candidate.

11. The method of claim 1, wherein the first candidate type corresponds to a default Merge candidate.

12. The method of claim 1, wherein a pruning process for the IBC Merge candidate list is skipped or simplified according to block area of the current block after a new candidate is added to the IBC Merge candidate list.

13. An apparatus for video coding baed on IBC (Intra Block Copy) coding tool, the apparatus comprising one or more electronic circuits or processors arranged to:
receive input data related to a current block in a current picture at a video encoder side or a video bitstream corresponding to compressed data including the current block in the current picture at a video decoder side;
generate an IBC Merge candidate list from Merge candidates associated with one or more candidate types, wherein one or more target candidates associated with a first candidate type are excluded from the IBC Merge candidate list when one or more constraints are satisfied; and
encode current motion information associated with the current block using the IBC Merge candidate list at the video encoder side or decode the current motion information associated with the current block at the video decoder side using the IBC Merge candidate list,
wherein a pruning process for the IBC Merge candidate list is skipped or simplified according to block width of the current block, block height of the current block or a combination thereof when adding a new candidate associated with a second candidate type into the IBC Merge candidate list.

14. A prediction method for video coding based on IBC (Intra Block Copy) coding tool, the method comprising:
receiving input data related to a current block in a current picture at a video encoder side or a video bitstream corresponding to compressed data including the current block in the current picture at a video decoder side;
generating an IBC Merge candidate list from Merge candidates associated with one or more candidate types, wherein a pruning process for the IBC Merge candidate list is skipped or simplified according to block width of the current block, block height of the current block, block area of the current block or a combination thereof after a new candidate is added to the IBC Merge candidate list; and
encoding current motion information associated with the current block using the IBC Merge candidate list at the video encoder side or decoding the current motion information associated with the current block at the video decoder side using the IBC Merge candidate list.

15. An apparatus for video coding based on IBC (Intra Block Copy) coding tool, the apparatus comprising one or more electronic circuits or processors arranged to:
receive input data related to a current block in a current picture at a video encoder side or a video bitstream corresponding to compressed data including the current block in the current picture at a video decoder side;
generate an IBC Merge candidate list from Merge candidates associated with one or more candidate types, wherein a pruning process for the IBC Merge candidate list is skipped or simplified according to block width of the current block, block height of the current block, block area of the current block or a combination thereof after a new candidate is added to the IBC Merge candidate list; and
encode current motion information associated with the current block using the IBC Merge candidate list at the video encoder side or decode the current motion information associated with the current block at the video decoder side using the IBC Merge candidate list.

16. A prediction method for video coding based on IBC (Intra Block Copy) coding tool, the method comprising:
receiving input data related to a current block in a current picture at a video encoder side or a video bitstream corresponding to compressed data including the current block in the current picture at a video decoder side;
generating an IBC Merge candidate list from Merge candidates associated with one or more candidate types, wherein one or more target candidates associated with a first candidate type are excluded from the IBC Merge candidate list when one or more constraints are satisfied; and
encoding current motion information associated with the current block using the IBC Merge candidate list at the video encoder side or decoding the current motion information associated with the current block at the video decoder side using the IBC Merge candidate list,
wherein a pruning process for the IBC Merge candidate list is skipped or simplified according to block area of the current block when adding a new candidate into the IBC Merge candidate list.

17. An apparatus for video coding based on IBC (Intra Block Copy) coding tool, the apparatus comprising one or more electronic circuits or processors arranged to:
receive input data related to a current block in a current picture at a video encoder side or a video bitstream corresponding to compressed data including the current block in the current picture at a video decoder side;
generate an IBC Merge candidate list from Merge candidates associated with one or more candidate types, wherein one or more target candidates associated with a first candidate type are excluded from the IBC Merge candidate list when one or more constraints are satisfied; and
encode current motion information associated with the current block using the IBC Merge candidate list at the video encoder side or decode the current motion information associated with the current block at the video decoder side using the IBC Merge candidate list, wherein a pruning process for the IBC Merge candidate list is skipped or simplified according to block area of the current block when adding a new candidate into the IBC Merge candidate list.

* * * * *